United States Patent
Zhao et al.

(10) Patent No.: US 7,751,712 B2
(45) Date of Patent: Jul. 6, 2010

(54) PASSIVE OPTICAL NETWORK AND DATA COMMUNICATION METHOD THEREOF

(75) Inventors: Jun Zhao, Shenzhen (CN); Jiang Feng, Shenzhen (CN); Nanling Li, Shenzhen (CN); Peilong Tan, Shenzhen (CN); Yu Liu, Shenzhen (CN); Chuanhai Huang, Shenzhen (CN); Wensheng Wu, Shenzhen (CN); Guangxiang Yang, Shenzhen (CN); Yong He, Shenzhen (CN); Wenwen Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 305 days.

(21) Appl. No.: 11/818,235

(22) Filed: Jun. 12, 2007

(65) Prior Publication Data
US 2007/0292132 A1 Dec. 20, 2007

Related U.S. Application Data

(63) Continuation of application No. PCT/CN2005/002164, filed on Dec. 13, 2005.

(30) Foreign Application Priority Data
Dec. 13, 2004 (CN) .................. 2004 1 0098490

(51) Int. Cl.
*H04J 14/00* (2006.01)

(52) U.S. Cl. ................. 398/72; 398/67; 398/68; 398/70

(58) Field of Classification Search ............ 398/25, 398/33, 38, 66–72, 93, 94, 197
See application file for complete search history.

(56) References Cited

U.S. PATENT DOCUMENTS

| 5,790,293 A * | 8/1998 | Frigo ............... 398/33 |
| 6,792,018 B2 * | 9/2004 | Couch .............. 372/38.02 |
| 7,274,874 B2 * | 9/2007 | Sung et al. .......... 398/58 |
| 2005/0147410 A1 * | 7/2005 | Smith ................ 398/5 |

FOREIGN PATENT DOCUMENTS

| CN | 1307409 A | 8/2001 |
| JP | 2003-43309 A | 2/2003 |

* cited by examiner

*Primary Examiner*—Dalzid Singh
(74) *Attorney, Agent, or Firm*—Finnegan, Henderson, Farabow, Garrett & Dunner LLP

(57) ABSTRACT

A Passive Optical Network includes: an Optical Line Terminal, an Optical Distribution Network, and an Optical Network Unit or an Optical Network Terminal, wherein the Optical Line Terminal is adapted to exchange data with the Optical Network Unit or the Optical Network Terminal by using an optical module via the Optical Distribution Network, and the optical module is an optical module sending data in a continuous mode. Further, a method for data communication based on the Passive Optical Network includes: sending data by using an optical module sending data in a continuous mode; receiving the data by an optical module based on a set optical power threshold of data "0" and a set optical power threshold of data "1".

9 Claims, 4 Drawing Sheets

PASSIVE OPTICAL NETWORK AND DATA COMMUNICATION METHOD THEREOF

CROSS-REFERENCE TO RELATED APPLICATIONS

The present application is a continuation application of PCT application No. PCT/CN2005/002164, filed Dec. 13, 2005, which claims priority of Chinese application No. 200410098490.X.

FIELD OF THE INVENTION

The present invention relates to a network communication technique, and particularly to a Passive Optical Network (PON) and data communication method thereof.

BACKGROUND OF THE INVENTION

The PON can be classified as a Broadband Passive Optical Network (BPON), an Ethernet Passive Optical Network (EPON), a Gigabit Passive Optical Network (GPON) and a Wavelength Division Multiplexing Passive Optical Network (WDM-PON), etc. As shown in FIG. 1, the PON includes an Optical Line Terminal (OLT), an Optical Distribution Network (ODN), and Optical Network Units (ONUs)/Optical Network Terminals (ONTs). The OLT acts as an interface of network side or service access node side. The ODN splits one optical signal sourced from the OLT into a number of optical signals and sends the optical signals to the ONUs/ONTs via optical modules downstream, and combines a number of optical signals from the ONUs/ONTs into one optical signal and sends the optical signal to the OLT via optical modules upstream. The ONUs/ONTs, located at user side, convert optical signals into electrical signals and send the electrical signals to user terminals downstream, and convert electrical signals from the user terminals into optical signals and send the optical signals to optical fibers upstream.

In the prior art, the OLT includes a burst mode optical receiver, which is used for correctly receiving burst data from ONUs/ONTs, and the ONU/ONT includes a burst mode optical transmitter, which is used for sending or receiving data in a burst mode responding to the grants assigned by the OLT in accordance with a predetermined scheduling algorithm in the OLT. In the case of sending data by using a burst mode optical module, a laser is only opened to send during the timeslots which are assigned to the ONU/ONT, and should be closed in other timeslots even the ONU/ONT has some data to be sent to OLT. In normal situation, only one laser of an ONU/ONT device can be opened during a timeslot. In this case, the optical power received at a receiving end of the OLT substantively depends on output power of the working laser and loss of the optical fiber links. The advantages of sending and receiving data with the burst mode optical modules are simple implementation and high precision, however, high cost compared with continuous optical modules.

In the prior art, tunable wavelength optical modules are used in the WDM-PON so that distributable fixed wavelengths can be utilized to send data by the optical modules of the ONU/ONT, which improves the utilization efficiency of the optical fibers. However, because the optical wavelengths sent from the ONU/ONT devices are different from each other, multiple optical receivers at the receiving end of OLT should be used to receive optical signals with different wavelengths. Thus, this technique is complex to be implemented. Since optical signals with different wavelengths, which represent different channels, need to be differentiated from each other by the OLT device, high stability of optical wavelengths sent from the ONU/ONT is required, thus high quality of the optical modules of the OLT and ONU/ONT devices is required. Therefore, prices of the optical modules are high, which results in high cost of the whole network.

SUMMARY OF THE INVENTION

An object of the present invention is to provide a passive optical network and a data communication method thereof in view of the above disadvantages in the prior art, Therefore, the cost of the Optical Network is decreased.

To achieve the above object, the present invention provides a passive optical network, including an Optical Line Terminal, an Optical Distribution Network, and an Optical Network Unit or an Optical Network Terminal, wherein the Optical Line Terminal is adapted to exchange data with the Optical Network Unit or the Optical Network Terminal by using an optical module via the Optical Distribution Network, and the optical module is an optical module sending data in a continuous mode.

The present invention further provides a method for data communication based on the Passive Optical Network, including:

sending data by using an optical module sending data in a continuous mode;

receiving the data by an optical module based on a set optical power threshold of data "0" and a set optical power threshold of data "1".

The method further includes: determining, whether the optical power thresholds are to be adjusted based on a measured optical power in a network; if yes, adjusting the optical power threshold of data "0" and the optical power threshold of data "1", otherwise, not performing the adjustment.

The optical power threshold of data "0" is a sum of a measured optical power of data "0" if no data is being transmitted and a first predetermined value; the optical power threshold of data "1" is a sum of an optical fiber attenuation power and a second predetermined value subtracted from a sum of a measured optical power of data "0" if no data is being transmitted and a launched optical power of the optical module.

The method further includes: measuring the optical power in the network when a system is initiated.

The method further includes: the optical power in the network is measured during an idle time between upstream data transmissions.

If the measured optical power is larger than the optical power threshold of data "0" and less than or equal to the optical power threshold of data "1", or if a difference between an optical power value of data "0" or "1" received this time and a corresponding optical power value of data "0" or "1" received last time is larger than or equal to a set threshold, adjusting the optical power thresholds.

The optical power threshold of data "0" is less than or equal to the optical power threshold of data "1". If the measured optical power is larger than or equal to the optical power threshold of data "1", receiving the data as "1"; and if the measured optical power is less than or equal to the optical power threshold of data "0", receiving the data as "0".

The method for data communication of the present invention further includes: during data transmission, detecting errors in data receiving according to a verification method specified in ITU-T. G983.1 protocol, and correcting the detected errors according to provisions of the ITU-T. G983.1 protocol.

The method for data communication of the present invention further includes: adjusting the thresholds by software or hardware manually.

The optical module sending data in a continuous mode is used in the OLT and ONU/ONT according to the present invention. Because the optical module sending data in a continuous mode is in a low price, the cost is reduced. Because the laser in the optical module sending data in a continuous mode may not be turned off when there is no data being transmitted, according to the method of the present invention, the determined threshold of the data can be adjusted in time during the idle time between the upstream data transmissions to ensure the correctness of the data received.

DETAILED DESCRIPTION OF THE INVENTION

Hereinafter, embodiments of the present invention are described with reference to the accompanying drawings.

Figure 4:
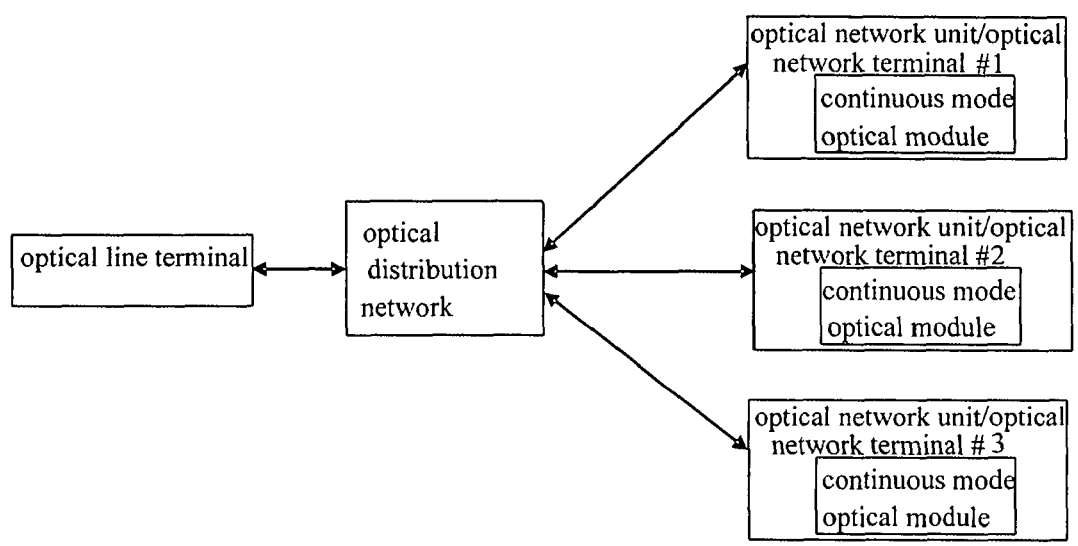
FIG. 4 is a schematic diagram illustrating architecture of a PON according to an embodiment of the present invention.

As shown in FIG. 4, in an embodiment of the present invention, the PON includes an Optical Line Terminal, an Optical Network Units/Optical Network Terminals, and an Optical distribution Network. Optical modules which send data in a continuous mode are used for data communication between the Optical Line Terminal and the Optical Network Units/Optical Network Terminals. The Optical Line Terminal (OLT) acts as an interface of network side or service access node side. The OLT receives optical signals from optical laser (the optical laser is a continuous mode transmitter or another type of transmitter in a continuous mode) of Optical Network Units (ONU) and Optical Network Terminals (ONT) via the Optical Distribution Network (ODN), converts the optical signals into electrical signals, then sends the electrical signals to the network side upstream. And, the OLT receives electrical signals from the network side, converts into optical signals, and then sends the optical signals to Optical Network Units (ONU) and Optical Network Terminals (ONT) via Optical Distribution Network (ODN) downstream. The Optical Distribution Network (ODN) in the downstream direction, splits one optical signal sourced from OLT into multiple optical signals and sends the multiple optical signals to the Optical Network Units/Optical Network Terminals, and in the upstream direction, combines multiple optical signals from the Optical Network Units/Optical Network Terminals into one optical signal and sends the optical signal to the Optical Line Terminal. The Optical Network Units/Optical Network Terminals locate at the user side. The Optical Network Units/Optical Network Terminals, in the downstream direction, convert optical signals into electrical signals and send the electrical signals to user terminals, and in the upstream direction, convert electrical signals from user terminals into optical signals and send the optical signals to optical fibers via the optical modules.

In the OLT and ONU/ONT devices of the PON according to the embodiment of the present invention, the continuous mode optical modules send data normally if there is data to be sent, and may not turn off the laser if no data is to be transmitted. When the laser is not turned off, a weak optical power that is relatively constant will be output, i.e., the optical power level "0". Therefore OLT can receive a relatively constant optical power when all ONU/ONT devices are not allowed to transmit data, the relatively constant optical power is referred to as power level "0" of OLT, which is resulted from accumulation of the optical power of "0" of all ONU/ONT devices in which the optical modules are in continuous mode.

In the PON according to the embodiment of the present invention, not all of the OLT and ONUs/ONTs devices utilize the continuous mode optical modules. It is possible that part of the OLT and ONUs/ONTs devices utilize the continuous mode optical modules. In another embodiment, the OLT and ONUs/ONTs devices utilize non-continuous mode optical modules, such as burst mode optical modules.

A method for data communication in the PON in which continuous mode optical modules are used is described in detail hereinafter.

At a sending end, an optical module sending data in a continuous mode or a non-continuous mode optical module sending data in a continuous mode sends data normally, and the optical module sending data in a continuous mode does not turn off a laser if there is no data to be sent. At a receiving end, the optical module determines a value of the received data in accordance with an optical power threshold of data "0" and an optical power threshold of data "1".

In the present invention, whether the received optical power in the case that there is no data being sent is an optical power needing to be adjusted is detected. For example, during the idle time between the upstream data transmissions, a continuous mode optical module determines that whether the detected optical power is an optical power needing to be adjusted, and if yes, adjusts an optical power threshold of data "0" and an optical power threshold of data "1"; otherwise, performs data communication normally. When an optical network system is initiates, the optical power threshold of data "0" and the optical power threshold of data "1" can be determined based on a measured optical power of data "0".

Figure 1:
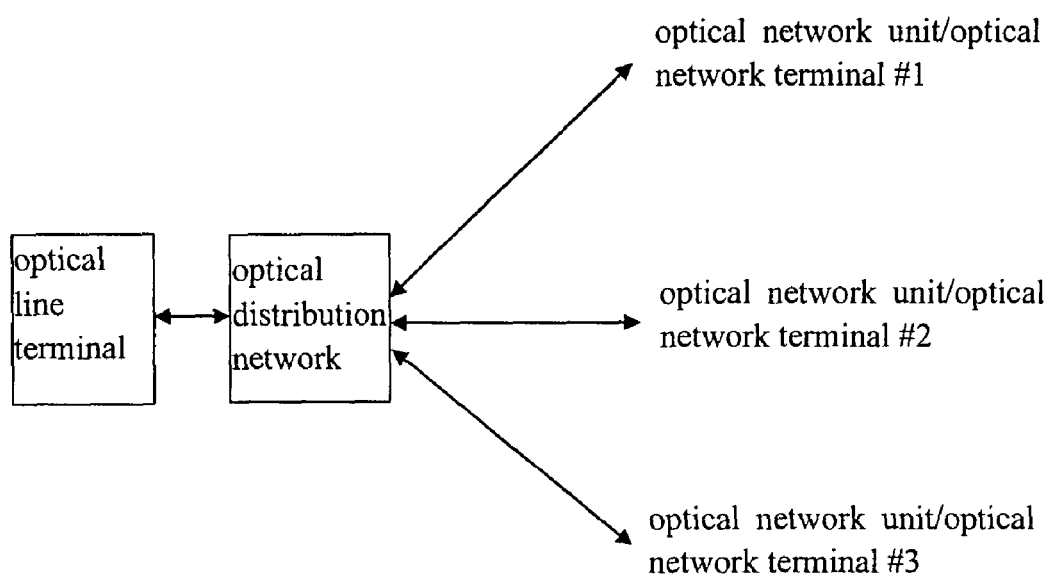
FIG. 1 is a schematic diagram illustrating architecture of a PON according to the prior art.
Figure 2:
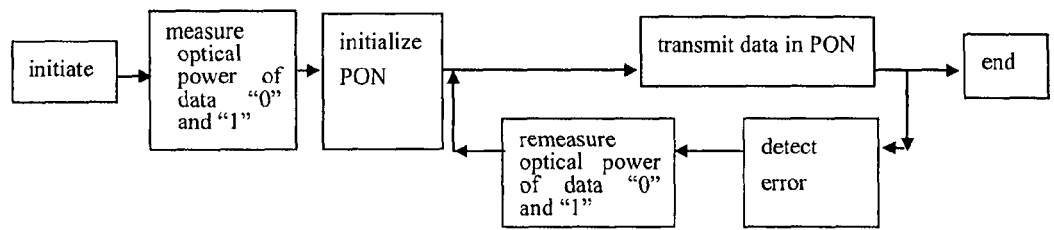
FIG. 2 is a schematic diagram illustrating a process of data communication according to an embodiment of the present invention.

As shown in FIG. 2, after the optical network system is initiated, an optical power of data "0" and an optical power of data "1" are firstly measured, and an optical power threshold of data "0" and an optical power threshold of data "1" are determined based on the measured optical power of data "0" and the measured optical power of the data "1", respectively. Then, the PON is initialized and data communication is performed thereafter. During the data transmission, when errors in data receiving are detected according to the verification method specified in ITU-T. G983.1 protocol, it indicates that an accident occurs. In this case, error correction is performed according to provisions of the protocol, and the optical power of data "0" and the optical power of data "1" are measured once again to thereby determine the optical power threshold of data "0" and the optical power threshold of data "1", then, data transmission is continued.

Figure 3:
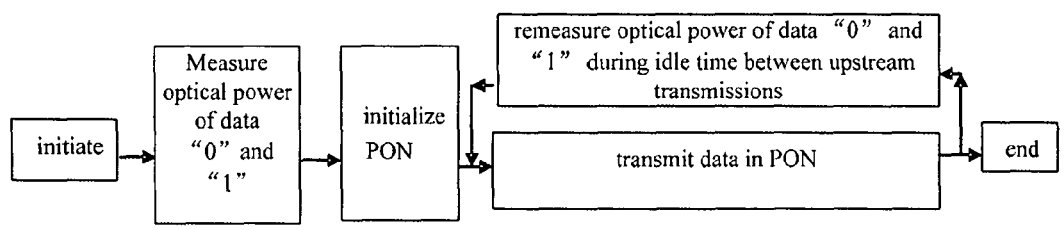
FIG. 3 is a schematic diagram illustrating a process of data communication according to another embodiment of the present invention.

According to the present invention, an optical power of data "0" and an optical power of data "1" are detected during the idle time between the upstream data transmissions. As shown in FIG. 3, after the optical network is initiated, during the idle time between the upstream data transmissions, an optical power of data "1" and an optical power of data "0" are measured and calculated, and then it is determined whether the received optical power is an optical power needing to be adjusted based on an optical power threshold of data "1" and an optical power threshold of data "0", and if yes, the optical power threshold of data "1" and the optical power threshold of data "0" are adjusted with the following method; otherwise, data receiving is performed normally.

Hereinafter, detailed description will be made to illustrate the method for adjusting the optical power threshold of data "1" and the optical power threshold of data "0" if the continuous mode optical module is used, as exemplified by OLT. If no data is being transmitted (for example, when the network is just initiated or during the idle time between the upstream data transmissions), an optical module of a certain OLT device and an accessory circuit thereof measure an optical power resulted from accumulation of weak optical powers from all of the devices related to the OLT in the optical network, such as all ONU/ONT devices connected with the OLT. The optical power of data "0" is determined based on the optical power measured rather than the optical power when the laser is turned off.

Therefore, in the embodiment of the present invention, the optical power threshold of data "0" and the optical power threshold of data "1" are set based on the optical power of data "0" and the optical power of data "1" measured during the idle time between the upstream data transmissions. In order to determine correctly whether the received optical power is the optical power of data "0", in the embodiment of the present invention, the optical power threshold of data "0" is set to be higher than the normally measured optical power of data "0", i.e., the optical power threshold of data "0" is set to be a sum of the measured optical power of data "0" and a first predetermined value. For example, the first predetermined value may be set to be higher than or equal to 20% of the measured optical power of data "0". In other words, if the received optical power of data "0" is increased by lower than or equal to 20%, i.e., less than or equal to the optical power threshold of data "0", the received optical power is still deemed as the optical power of data "0".

Similarly, during the idle time between the upstream data transmissions, the optical power threshold of data "1" can be determined based on the characteristic of the continuous mode optical module (for example, the launched optical power of the optical module and the optical power if no data is being transmitted) and the characteristic of the optical network (for example, transmission loss). If the optical signal is transmitted into an optical fiber, there is certain loss during the transmission. This loss value is referred to as optical fiber transmission loss value, also referred to as optical fiber attenuation loss. Thus, when data sent from a certain ONU/ONT to the OLT via ODN is "1", the optical power received at the OLT end is as follows, optical power of data "1"=optical power of data "0"+the launched optical power of the optical module−transmission loss of ODN. In order to correctly receive data to some degree, in the embodiment of the present invention, preferably, the optical power threshold of data "1" is normally set to be lower than the optical power of received data "1", i.e., the optical power threshold of data "1"=optical power of data "0"+the launched optical power of the optical module−transmission loss of optical fiber−a second predetermined value. For example, the second predetermined value may be set as less than or equal to 20% of the received optical power. In other words, when the optical power of the received data is decreased by 20%, i.e., the optical power of the received data is larger than or equal to the optical power threshold of data "1", the optical power is still deemed as the optical power of data "1".

The optical power threshold of data "0" is less than or equal to that of data "1".

In addition, during the idle time between the upstream data transmissions, if the optical power of the received data is larger than the optical power threshold of data "0" while less than or equal to the optical power threshold of data "1", the optical power of the received data is deemed as an optical power needing to be adjusted; or if the change range of optical power of the received data "0" and the change range of data "1" are larger than or equal to a certain threshold respectively, the optical power of the received data is deemed as an optical power needing to be adjusted. For example, when a difference between the optical power of the received data "0" and the optical power of the previously received data "0" is bigger than a predetermined value, the optical power is deemed as an optical power needing to be adjusted; or if a difference between the optical power of the received data "0" and an average of the optical powers of data "0" received for the last several times (for example, three times) is bigger than a predetermined value, the optical power of the received data is deemed as an optical power needing to be adjusted.

If the optical power of the received data is an optical power needing to be adjusted, the optical power threshold of data "0" and the optical power threshold of data "1" is to be adjusted. A method for adjusting the optical power threshold of data "0" and the optical power threshold of data "1" is the method for setting the optical power threshold of data "0" and the optical power threshold of data "1", which has been discussed as above and will not be described here. Otherwise data transmission is performed normally.

Furthermore, if changes of the optical power threshold of data "0" and the optical power threshold of data "1" are identified in advance, the thresholds may be adjusted by software and hardware manually, i.e., the thresholds as mentioned above may be set in advance, or set dynamically according to link condition.

Although the present invention is described with the embodiments, it is obvious for the skilled in the art that various modifications and changes can be made without departing from the spirit and substance of the present invention. It is intended that the scope of the present invention is defined by the appended claims.

What is claimed is:

1. A Passive Optical Network, comprising:
    an Optical Line Terminal (OLT), an Optical Distribution Network (ODN), and an Optical Network Unit (ONU),
    wherein the ONU is configured to send data via a optical module in continuous mode; and
    the OLT is configured to receive the data from the ONU based on a set optical power threshold of data "0" and a set optical power threshold of data "1" and determine whether the optical power thresholds are to be adjusted based on a measured optical power in a network; if yes, adjusting the optical power threshold of data "0" and the optical power threshold of data "1", otherwise, not performing the adjustment,
    wherein the optical power threshold of data "0" is a sum of a measured optical power of data "0" if no data is being transmitted and a first predetermined value; the optical power threshold of data "1" is a sum of an optical fiber attenuation power and a second predetermined value subtracted from a sum of a measured optical power of data "0" if no data is being transmitted and a launched optical power of power level "1".

2. The passive optical network according to claim 1, wherein if the measured optical power is larger than the optical power threshold of data "0" and less than or equal to the optical power threshold of data "1", or if a difference between an optical power value of data "0" or "1" received this time and a corresponding optical power value of data "0" or "1" received last time is larger than or equal to a set threshold, adjusting the optical power thresholds.

3. A method for data communication based on the Passive Optical Network, the method comprising:
sending data by using an optical module sending data in a continuous mode;
receiving the data by an optical module based on a set optical power threshold of data "0" and a set optical power threshold of data "1"; and
determining whether the optical power thresholds are to be adjusted based on a measured optical power in a network; if yes, adjusting the optical power threshold of data "0" and the optical power threshold of data "1", otherwise, not performing the adjustment,
wherein the optical power threshold of data "0" is a sum of a measured optical power of data "0" if no data is being transmitted and a first predetermined value; the optical power threshold of data "1" is a sum of an optical fiber attenuation power and a second predetermined value subtracted from subtracted from a sum of a measured optical power of data "0" if no data is being transmitted and a launched optical power of power level "1".

4. The method for data communication according to claim 3, further comprising: measuring the optical power in the network when a system is initiated.

5. The method for data communication according to claim 3, further comprising: the optical power in the network is measured during an idle time between upstream data transmissions.

6. The method for data communication according to claim 5, comprising:
if the measured optical power is larger than the optical power threshold of data "0" and less than or equal to the optical power threshold of data "1", or if a difference between an optical power value of data "0" or "1" received this time and a corresponding optical power value of data "0" or "1" received last time is larger than or equal to a set threshold, adjusting the optical power thresholds.

7. The method for data communication according to claim 3, wherein,
the optical power threshold of data "0" is less than or equal to the optical power threshold of data "1";
if the measured optical power is larger than or equal to the optical power threshold of data "1", receiving the data as "1";
if the measured optical power is less than or equal to the optical power threshold of data "0", receiving the data as "0".

8. The method for data communication according to claim 3, further comprising, during data transmission, detecting errors in data receiving according to a verification method specified in ITU-T. G983. 1 protocol, and correcting the detected errors according to provisions of the ITU-T. G983. 1 protocol.

9. The method for data communication according to claim 3, wherein, the optical power in the network is measured during an idle time between upstream data transmissions.

* * * * *